Patented Jan. 18, 1944

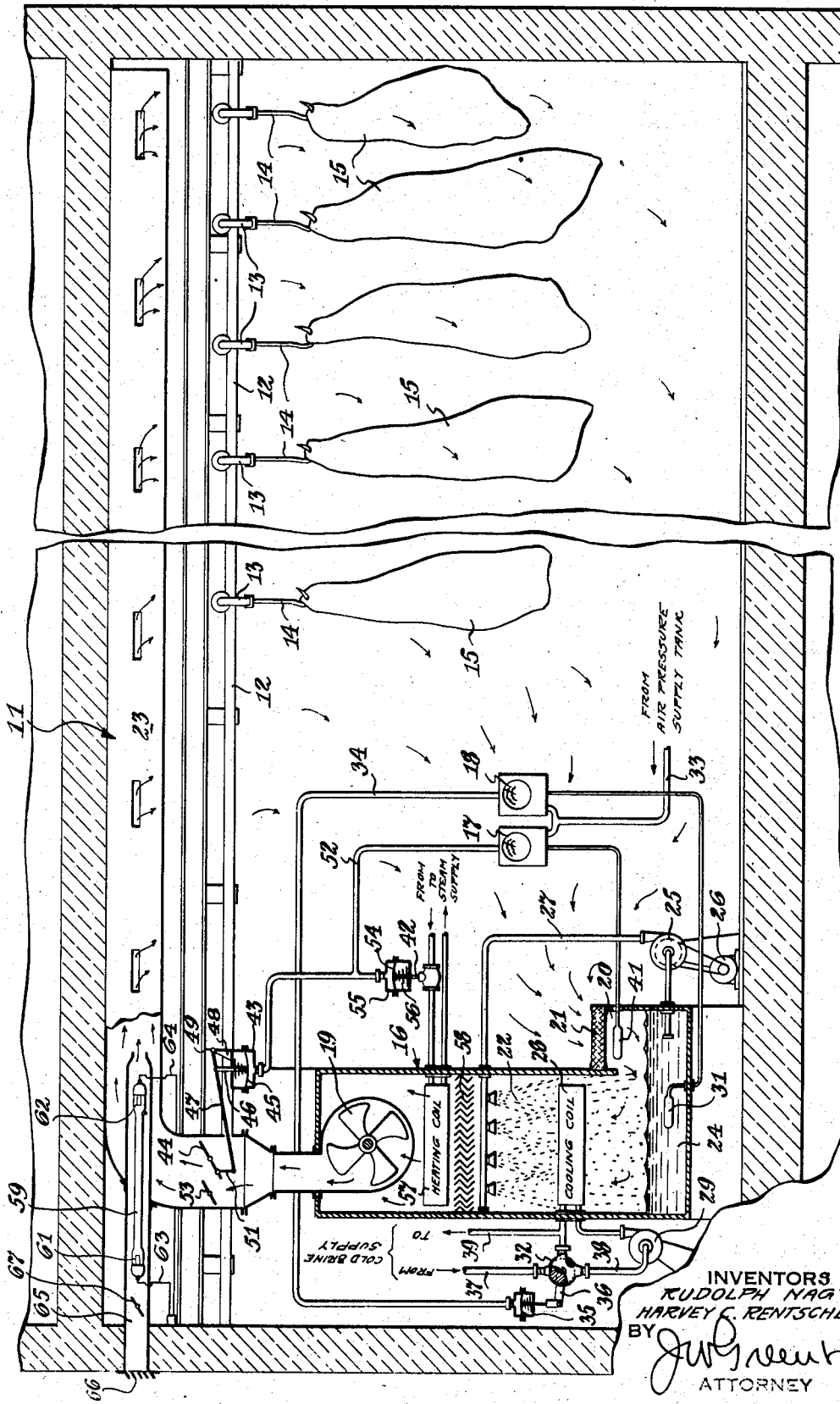

2,339,507

UNITED STATES PATENT OFFICE 2,339,507

STERILIZATION AND TREATMENT OF FOOD USING LOW CONCENTRATIONS OF OZONE

Rudolph Nagy, Bloomfield, and Harvey C. Rentschler, East Orange, N. J., assignors to Westinghouse Electric & Manufacturing Company, East Pittsburgh, Pa., a corporation of Pennsylvania Application November 13, 1940, Serial No. 365,444

3 Claims. (Cl. 99—107)

This invention relates to sterilization and the treatment of food, and especially to a modification of a method and apparatus for tenderizing meat, following generally the teachings of the James Patent No. 2,169,081, dated August 8, 1939, and owned by the Westinghouse Electric & Manufacturing Company.

The principal object of our invention, generally considered, is to treat food, and especially meat such as beef, to inhibit bacterial and mold growth or sterilize the surface thereof to prevent spoilage while being tenderized.

Another object of our invention is to provide a method of food sterilization, particularly adapted for use in connection with the quick tenderization of meat.

A further object of our invention, is the employment of concentrations of ozone between one-tenth and one part per million for relatively long periods of time, such as from twenty to forty hours, or continually, rather than higher concentrations for short periods of time, to effect surface sterilization of foodstuffs, including more especially beef.

A still further object of our invention is the provision of apparatus for efficiently generating and controlling the concentration of ozone, as for use in surface sterilization of foodstuffs, and especially meat during tenderization thereof.

Other objects and advantages of the invention, relating to the particular arrangement and construction of the various parts, will become apparent as the description proceeds.

The bactericidal and fungicidal action of ozone ($O_3$) has been known for a long time, and this knowledge has been put to a limited use. The ozone concentrations generally employed are very high, that is, between about two and sixty-five hundred parts per million. Concentrations of two to five parts per million have been used in cold storage plants. Such amounts of ozone are usable only for short periods, one hour, for example, twice a day and at such times when employees were not in the coolers. Higher concentrations are impractical.

In accordance with our invention, we employ a concentration of ozone of between one-tenth and one part per million, for example, about one-half part per million. Such ozone may be generated by any known means, such as an ozonizer which produces no oxides of nitrogen, but preferably by a cold quartz lamp, that is, a low pressure quartz mercury discharge lamp or one generating an appreciable proportion of ultra-violet radiations below 2000 A. U. in order to efficiently produce ozone of the desired quality. Such a lamp is desirably placed in a duct through which air or oxygen passes to be ozonized, drawn therefrom, and mixed with the air circulated in the refrigerator, or other compartment, in which the meat or other food is held.

The life of an ozone molecule is relatively short, at most about one-half hour in meat rooms and, therefore, the concentration of this agent will never be very high. However, to prevent a condition whereby the building up of an abnormal amount of ozone in the air might occur, a special filter is desirably placed in the intake opening to the re-circulating apparatus. This filter may be made of glass wool impregnated with manganese dioxide which acts as a catalytic agent in decomposing ozone to oxygen. Such a filter will, therefore, be good over long periods of time. The concentration of ozone, however, is readily controlled by proper adjustment of the ozone generator and air circulation.

In the James Patent No. 2,169,081, previously referred to, there is disclosed and claimed a process for the treatment of meat in order to tenderize the same at an increased speed, while at the same time avoiding the development of bacteria and mold on the surface of said meat. The process of said patent has proved very successful, and apparatus such as disclosed is successfully used for the purpose. In accordance with our invention, we propose to follow generally the teachings of said patent, and the improvement application, Serial No. 316,496, filed January 31, 1940, by Paul B. Christensen for "Method and apparatus for treating food," and owned by the assignee of the present application, using low concentrations of ozone in place of the ultra-violet radiation, and thereby making it possible to substitute a single quartz lamp or other ozonizer for the sterilizing ultra-violet lamps as employed in connection with the method of the patent and application referred to.

In the drawing, the single figure is a vertical sectional view of a refrigerator or meat-treating compartment embodying and including means for practicing our invention.

Referring to the drawing in detail, there is shown a fragmentary portion of a commercial meat tenderizing compartment or cooler 11, provided with rails 12, on which meat carriages 13 travel, said carriages being desirably provided with hooks or other meat-holding means 14, from which normally suspend carcasses or pieces of meat or beef 15.

The compartment 11 may be entered through a vestibule or anteroom (not shown) having a door leading to the outside, or any suitable means for entrance and egress may be provided. Refrigerating coils may be disposed directly in the meat-treating compartment, as shown in the James patent referred to, or as illustrated in the present drawing, in which there is shown a spray air-conditioning unit 16, the operation of which is controlled by instruments 17 and 18. The desired temperature of above 45° F., and preferably above about 55° F., or about 60° F. is maintained in the compartment by circulating air from the room through the unit 16, as by means of a fan or blower 19. The air enters unit 16 through inlet 20, covered by means for transforming ozone into oxygen, such as a glass wool filter 21 impregnated with manganese dioxide, which acts as a catalytic agent for the purpose. The air then passes upward through water spray 22, in which it is cooled to the desired temperature, preferably about 56° F. or about 4° lower than the desired temperature of the air in said compartment, at the same time being saturated to approximately 95% relative humidity by said spray, after which it passes again into the compartment 11 through duct or system 23.

The water which forms the spray 22 is forced from a reservoir 24, as by means of pump 25 driven by motor 26, through pipe 27. It is maintained at a desired constant temperature of about 56° F., as by cooling coil 28, through which flows cold brine circulated as by means of pump 29. The temperature of water 24, and consequently that of the spray 22, is desirably regulated by instrument 18, which is actuated by the temperature-sensitive bulb 31, located in the reservoir of spray water 24. The instrument 18, in turn, actuates the three-way mixing valve 32, as by means of compressed air, from air pressure supply tank line 33 to branch line 34. The air in the line 34 acts on the diaphragm 35 when desired, and moves the valve lever 36 to introduce more or less of the cold brine from the supply pipe 37 to the circulating pipe 38, which connects with the cooling coil 28, whereby the temperature of said cold coil corresponds with the needed temperature of the spray water for maintaining a desired tenderizing temperature of about 60° F. in the compartment 11.

The operation of the instrument 18 is such that when the spray water in the reservoir 24 is at the desired temperature, no compressed air is admitted to the pipe 34, so that the valve 32 is closed entirely against brine from the cold supply through pipe 37, and opened entirely for recirculating in the line 38. When, however, the temperature of the water in the reservoir is too high, compressed air is allowed to flow through pipe 34 to act on the diaphragm 35 and turn the lever 36 of the valve 32, allowing more or less of the cold brine to flow from the supply through pipe 37 into the system through pipe 38, until the brine circulated by the pump 29 is at the desired temperature. An amount of brine equal to that introduced by the three-way valve 32, flows back to the cold brine supply through the return pipe 39.

By thus maintaining the water spray at a constant temperature of desirably about 4° less than that of the air in the compartment, or say 56° F., the dew point of the air leaving the unit through duct system 23 is maintained constant. This is dependent on having a sufficient quantity of spray 22 to saturate the air to about 95% when the unit is circulating the maximum quantity of air.

The dry bulb temperature of the compartment is controlled by the instrument 17, which has its temperature-sensitive element 41, located below the filter 21 in the inlet to the air-conditioning unit 16. Instrument 17 may be a standard pneumatic-type temperature controller, which operates a standard pneumatically-operated steam valve 42, and a standard pneumatically-operated damper motor 43. Damper motor 43 operates a full-floating damper 44, as by means of a diaphragm 45, connecting rod 46, lever 47, pivoted to bracket 48, as indicated at 49, and link 51, pivoted to the free end of lever 47 and to damper 44.

When air passing over the bulb 41 is at a desired control temperature of say 60° F., the bulb 41 controls the instrument 17 so that it allows a certain definite air pressure, say 7½ pounds per square inch, to be supplied to branch line 52 from the main air supply 33, in which the pressure is desirably from 15 to 17 pounds per square inch. With this 7½ pound gauge pressure in line 52, steam valve 42 is adjusted so as to be in closed position, and damper motor 43 is adjusted so as to hold the lever 47 in its neutral position which, in turn, holds damper 44 in its horizontal or closed position.

When the refrigerator load in the compartment 11 is at a minimum, that is, when meat to be tenderized has reached normal tenderizing temperature, the damper 44 is in its horizontal position. The auxiliary damper 53 is then set by hand to such a position as to allow just sufficient air to pass from unit 16 through duct system 23 into the compartment 11 to maintain the desired temperature therein.

If the temperature of the air passing over bulb 41 increases, said bulb actuates instrument 17 in such a manner as to allow the pressure of the air on the line 52 to increase. This actuates damper motor 43 to move lever 47 and damper from its closed position to an inclined or open position, thus allowing more air to pass into duct system 23 and from there back into the compartment 11, to reduce the temperature therein while keeping steam valve 42 closed.

If the temperature of the air passing over bulb 41 is lowered to the control point, that is to 60° F., for example, the entire mechanism will return to its original position with the damper 44 horizontal. If the temperature of the air passing over the bulb 41 falls below the control point, as when a new supply of refrigerated or chilled beef is introduced into the compartment 11, the bulb 41 actuates instrument 17 in such a manner as to decrease the air pressure in branch line 52 below 7½ pounds as the air passes through the instrument from supply line 33. This reduction in air pressure allows the diaphragm 54 of the steam valve controlling motor 55 to move upwardly under the action of spring 56, and open the valve 42, admitting steam to the heating coil 57. At the same time the reduction of air pressure in line 52 actuates damper motor 43, moving damper 44 from its horizontal or closed position toward an inclined or open position.

This combination of actions reheats the air after it passes through spray 22 and baffles 58, which latter remove water drops therefrom, and allows an increased quantity of this air of decreased relative humidity to pass through duct 23 into the compartment 11 to increase the temperature of the air therein. As the temperature in said compartment is brought to a point at which the air passing over bulb 41 is returned to the control point, say 60° F., the entire mechanism again returns to its original position at said point.

It will be seen that by virtue of the temporary increase in temperature and corresponding reduction in humidity after a batch of cold meat has been introduced into the compartment, said increased temperature and relative dryness serves to more quickly bring the chilled meat to a normal tenderized temperature and, at the same time, avoids a condensation of any appreciable or undesirable amount of moisture on said meat during the warming up period.

Inasmuch as the present invention involves a modification of the method disclosed in the James patent previously referred to, and one of the primary objects is to make it possible to tenderize beef and other meat in a shorter time than in accordance with the old hanging method, it is essential that an inhibitor of aerobic growths shall be used. In other words, at the substantial increase in temperature at which meat is held for tenderizing purposes, it is not possible, without such means, to prevent rapid aerobic growths and we, therefore, propose to use inhibiting means to prevent spoilage due to surface deterioration from such growths, which are either present on the meat as received in the compartment, or may be deposited thereon from the air.

The surface growth inhibiting means proposed, in accordance with our invention, is an ozone generator 59, which may be a silent electric-discharge ozonizer, but is preferably a low pressure mercury discharge lamp having a quartz envelope enclosing electrodes 61 and 62, one at each end thereof, and actuated from a suitable source of power through leads 63 and 64. Such a generator is disposed in a duct 65, which may open inside, but preferably outside of the compartment 11 through louvres 66, or receive air from a blower or the like. However, inasmuch as the discharge end of the duct 65 opens into the duct system 23, no means for driving air through the duct 65, other than the suction created by the air movement in said duct system, is necessary for drawing air over the ozone generator 59 and on into said system. A valve 67 in the duct 65 is desirably provided for controlling the flow of air therein.

It will be understood that the ozone generator 59, although shown in a duct separate from the system 23, may, if desired be positioned in said system. However, it is preferable to enclose the generator 59 in a separate duct for two reasons; first, the flow of air thereover is more accurately controlled; and second, it is preferable to ozonize dry air and then introduce it into the humidified duct system, rather than ozonize the moist air initially.

It will be understood that we contemplate, not only drawing air from the compartment for recirculation over the ozone generator, or dry air or gas comprising oxygen from the outside of the compartment over the ozone generator, or forcing such dry gas by a blower or other means over said generator and on into the duct system 23, but also artificially drying said air before introduction to the duct 65, or ozonizing a mixture of fresh and recirculated air, if conditions make it necessary or desirable.

In operating the apparatus herein described, the size of the generator 59, the energy put into it, and the flow of air thereover, are so determined and controlled that the ozone concentration maintained in the compartment 11, is between one-tenth and one part per million, or preferably approximately in the neighborhood of one-half part per million, whereby the surface of the meat or other food in the compartment is maintained nearly free from bacteria and other micro-organisms during a tenderizing period of say about two or three days.

We find that by applying the ozone continuously over a long period of time the action is more effective than is possible with higher concentration for a correspondingly shorter time, both in inhibiting bacterial and mold growth, as well as in destroying the bacteria and mold spores. Thus a concentration of one part per ten million for twenty hours is more effective than to use a concentration of two parts per million for one hour.

The flow of air through the duct 23 creates a suction on the duct 65, withdrawing the ozone therefrom, as generated by the discharge lamp 59, at the same time diluting and humidifying it to the proper extent by admixing the ozonized air with the humidified air produced in the apparatus 16. On account of the relatively small amount of ozonized dry air drawn in from the duct 65, the initial humidification of the air need only be slightly increased, as by increasing the volume of the water spray 22, over that without such admixture of dry air, to have the desired final humidification in the compartment 11.

Although we have disclosed our invention as particularly adapted for the tenderization of meat, it will be understood that it may be employed in any manner where it is desired to sterilize the surface of material, such as food, and free the same from micro-organisms, such as bacteria and molds, or inhibit the growth of such organisms thereon.

Although a preferred embodiment of our invention has been disclosed, it will be understood that modifications may be made within the spirit and scope of the appended claims.

We claim:

1. In apparatus for treating and/or storing meat, the combination of a compartment having air-distributing ducts, a normally closed damper for controlling the flow of air in said ducts, air conditioning means disposed in said compartment and comprising a chamber connected to said ducts and having a reservoir of water disposed in the bottom thereof, a blower in the top thereof for circulating air from said compartment through said chamber over said water and distributing it to said compartment through said ducts, spray nozzles disposed between said water and blower, means for drawing water from said reservoir and discharging it through said nozzles to humidify the circulating air and return to said reservoir, means in said compartment for controlling the temperature of said water, temperature-sensitive means immersed in said water to govern the action of said controlling means, a cooling coil in the path of spray from said nozzles, said controlling means causing circulation of more or less cooling fluid to said cooling coil to keep the reservoir of water at substantially uniform temperature in accordance with the action of said sensitive means, a heating coil disposed between said nozzles and blower, a temperature controller disposed in said compartment, sensitive means in the inlet to said chamber for causing said temperature controller to effect the admission of heating fluid to said heating coil when the temperature of the air in said inlet is reduced below a predetermined point and simultaneously open said damper to allow increased circulation through said ducts to bring the temperature in said compartment back to normal, means for feeding a predetermined proportion of dry ozonized air into said air-distributing ducts for mixing with the humidified air, and means in the inlet to said chamber for de-ozonizing air to avoid building up too high a concentration of ozone in said compartment.

2. The method of treating meat comprising moving the same while chilled into a compartment having air-distributing ducts and conditioning means disposed therein and comprising a chamber connected to said ducts and containing water while a blower in the top thereof circulates air from said compartment through said chamber over said water and distributes it to said compartment through said ducts, introducing a predetermined proportion of dry ozonized air to said circulating air, circulating and spraying said water to humidify said circulating air, cooling said water with means automatically controlled as to temperature and disposed in the spray, automatically energizing heating means in the chamber when the temperature of the air entering said chamber is reduced below a predetermined point, simultaneously increasing the air circulation through said ducts to bring the temperature in the compartment back to normal, and de-ozonizing said air as it passes from said compartment to said chamber to avoid building up the ozone concentration beyond a predetermined point.

3. The method of treating meat comprising holding the same in a compartment, circulating the air from said compartment into and out of means for humidifying the same and maintaining it at a temperature of about 60° F. in order to hasten tissue changes in said meat to a point of tenderness, and introducing into said air before it is discharged from said chamber to said compartment a regulated proportion of ozonized dry air in order to inhibit the growth of molds and bacteria on said meat, and de-ozonizing the air as it passes from said compartment to said chamber for humidification and temperature control.

RUDOLPH NAGY.
HARVEY C. RENTSCHLER.